(12) United States Patent
Zimmerman et al.

(10) Patent No.: US 12,139,807 B2
(45) Date of Patent: Nov. 12, 2024

(54) ELECTRODE ASSEMBLY FOR ELECTROCHEMICAL PROCESSES AND METHOD OF RESTORING THE SAME

(71) Applicant: PERMASCAND AKTIEBOLAG, Ljungaverk (SE)

(72) Inventors: Erik Zimmerman, Frösön (SE); Christian Almroth, Sundsvall (SE); John Gustavsson, Ljungaverk (SE); Per Magnus Sjödell, Torpshammar (SE)

(73) Assignee: PERMASCAND AKTIEBOLAG, Ljungaverk (SE)

( * ) Notice: Subject to any disclaimer, the term of this patent is extended or adjusted under 35 U.S.C. 154(b) by 420 days.

(21) Appl. No.: 17/616,484

(22) PCT Filed: May 28, 2020

(86) PCT No.: PCT/EP2020/064890
§ 371 (c)(1),
(2) Date: Dec. 3, 2021

(87) PCT Pub. No.: WO2020/245032
PCT Pub. Date: Dec. 10, 2020

(65) Prior Publication Data
US 2022/0228279 A1    Jul. 21, 2022

(30) Foreign Application Priority Data

Jun. 3, 2019   (EP) .................................. 19177920

(51) Int. Cl.
C25C 7/02   (2006.01)
C25C 1/00   (2006.01)
C25C 7/06   (2006.01)

(52) U.S. Cl.
CPC .............. *C25C 7/02* (2013.01); *C25C 1/00* (2013.01); *C25C 7/06* (2013.01)

(58) Field of Classification Search
CPC ...................................................... C25C 7/02
See application file for complete search history.

(56) References Cited

U.S. PATENT DOCUMENTS

2010/0276281 A1   11/2010  Sandoval
2012/0205239 A1    8/2012  Gonzalez Olguin

FOREIGN PATENT DOCUMENTS

CN    108728864 A    11/2018
EP     0434622 A1     6/1991
(Continued)

OTHER PUBLICATIONS

Office Action from Indian Patent Application No. 202127051558 mailed May 31, 2023, 6 pages.
(Continued)

*Primary Examiner* — Ciel P Contreras
(74) *Attorney, Agent, or Firm* — Shih IP Law Group, PLLC

(57) ABSTRACT

The invention relates to an electrode assembly for an electrochemical process comprising a current supply element comprising at least one recessed hole; at least one current distribution bar comprising a first end portion and a second end portion, the first end portion being releasably arranged at the at least one recessed hole; and an electrode substrate arranged at the at least one current distribution bar. The current distribution bar comprises a core and an outer layer, the core being completely covered by the outer layer. The invention also relates to a method of restoring the electrode substrate of the electrode assembly without removing the electrode substrate from the at least one current distribution bar.

20 Claims, 5 Drawing Sheets

(56) References Cited

FOREIGN PATENT DOCUMENTS

| WO | 2013002756 A1 | 1/2013 | | |
|---|---|---|---|---|
| WO | WO-2013150163 A1 * | 10/2013 | ............... | C25C 1/16 |
| WO | 2017064485 A1 | 4/2017 | | |
| WO | 2017/187357 A1 | 11/2017 | | |

OTHER PUBLICATIONS

International Search Report from International Application No. PCT/EP2020/064890 mailed Aug. 4, 2020.
Office Action from CN Application No. 202080036489.1 mailed Dec. 12, 2023, 20 pages.
Office Action from CN Application No. 202080036489.1 mailed Jul. 15, 2024, 18 pages.

* cited by examiner

ELECTRODE ASSEMBLY FOR ELECTROCHEMICAL PROCESSES AND METHOD OF RESTORING THE SAME

CROSS-REFERENCE TO RELATED APPLICATION

This Application is the National Stage filing under 35 U.S.C. § 371 of PCT Application Ser. No. PCT/EP2020/064890 filed on May 28, 2020, which claims the benefit of European Patent Application No. 19177920.6 filed on Jun. 3, 2019. The disclosures of both applications are hereby incorporated herein by reference in their entireties.

FIELD OF THE INVENTION

The present invention relates to the field of electrodes, and more particularly to an electrode assembly for use in electrochemical processes and a method of restoring an electrode substrate of such an electrode assembly.

BACKGROUND OF THE INVENTION

Electrowinning is an example of electrochemical processes in which metals can be recovered from solutions bearing the metal in ionic form. These processes take place in electrolytic cells comprising electrodes in the form of one or more cathodes and one or more anodes, arranged alternately, which are immersed in the solution. When a current is passed through the electrolytic cell, the desired metal is plated onto the cathode.

A typical electrode assembly for electrowinning comprises a current supply bar, often referred to as a hanger bar, which is arranged to extend horizontally over the electrolytic cell. The electrode assembly further comprises current distribution bars attached at the current supply bar and extending vertically therefrom, onto which an electrochemically active electrode substrate is attached, for example by welding. The electrode substrate is often composed of a base structure and an electrochemically active coating applied to the base structure. The materials of the base structure and the coating, as well as that of the current distribution bars are adapted to the process in which the electrode assembly is used. The current distribution bars are composed of an electrically conducting material, for conducting current from the hanger bar to the electrode substrate. As an example, for an anode used in electrowinning, electrically conducting materials generally used are copper and aluminium. Due to the low resistance to e.g. corrosion of these materials, it is necessary to apply a cladding thereto of a metal which is chemically resistant to the electrolyte solution used. Typically for anodes, a titanium cladding, or a cladding of another valve metal is used. Valve metals are also often used for the base structure of the electrode substrate. These metals are known as film-forming metals having the property of rapidly forming a passivating oxide film when connected as an electrode in the electrolyte in which the electrode assembly is expected to operate, which protects the underlying metal from corrosion by the electrolyte.

US2010/0276281 discloses such a typical electrode assembly.

During use of the electrode assembly, the electrochemically active coating of the electrode substrate loses activity or effectiveness over time, resulting in ohmic losses and high cell voltages in the electrolytic cell which, in turn, leads to an increased electric energy consumption. Thus, in order for the electrode to remain effective, the electrochemical activity of the electrode substrate needs to be restored. Currently, in order to restore the electrochemical activity, the electrode substrate is generally removed from the current distribution bars, and replaced by a new coated electrode substrate. Considering the value of the material constituting the electrode substrate and its coating, exchange of a used electrode substrate for a new one involves high costs. The electrode assembly disclosed in US2010/0276281 is not arranged to be demounted, and there is no teaching about whether restoration could be performed.

U.S. Pat. No. 4,088,558 discloses a method of renewing electrode surfaces of metal electrodes in which, after removal of the electrode member from supporting risers, the electrode member is recoated and thereafter mounted anew at the supporting riser. Removal of the electrode member involves punching or drilling out the weld joints by which the electrode member is attached to the supporting riser. The recoated electrode member is then mounted at the supporting riser by means of spot welding. This results in a quite time and energy consuming process.

SUMMARY OF THE INVENTION

It would be advantageous to provide a more efficiently restorable electrode assembly for electrochemical processes.

To better address this concern, in a first aspect of the invention there is presented an electrode assembly for an electrochemical process comprising a current supply element comprising at least one recessed hole; at least one current distribution bar comprising a first end portion and a second end portion, the first end portion being releasably arranged at the at least one recessed hole; and an electrode substrate arranged at the at least one current distribution bar. The current distribution bar comprises a core and an outer layer, the core being completely covered by the outer layer.

The releasably arrangeable current distribution bar allows for an easy removal of the current distribution bar with the electrode substrate arranged thereat when restoration of the electrochemical activity of the electrode substrate is needed, or for any other reason. Furthermore, due to the outer layer completely covering the core of the current distribution bar, it is possible to subject the electrode substrate to a restoration treatment without removing it from the current distribution bar. Such restoration treatment may include cleaning the electrode substrate and removing any residual coating therefrom, for example by submerging the electrode, and thus, the current distributor bar, into a salt bath, and subsequently recoating the electrode substrate. Subjecting a portion of the current distribution bar which is not covered by the outer layer, i.e. where the core is exposed, to a treatment for removing any residual coating from the substrate would typically lead to the core being dissolved at a higher rate than the substrate coating, due to the higher chemical reactiveness of the core material. This is highly undesirable as it would damage the current distribution bar. By providing a core which is completely covered by an outer layer, in accordance with the present electrode assembly, the core would not be exposed and such prejudicial reaction is prevented. Thereby, the electrode substrate can be treated for removal of residual coating while still attached to the current distribution bar.

Recoating the electrode substrate generally involves thermal treatment at temperatures between 300 and 600° C. In the current distribution bar, the coefficient of thermal expansion of the core is generally higher than that of the outer layer. In known electrode assemblies, current distribution bars comprising a core and an outer layer are often clad and are provided as long bars, which then are cut into the desired length, leaving the ends of the cut bars free from any cladding. When such bars are subjected to thermal cycles, the thermal expansion of the core material being larger than the thermal expansion of the clad material may result in the core material projecting out of the outer layer at the end of the bar, where it is free to expand. It was conveniently found, however, that a current distribution bar according to the invention, comprising a core being completely covered by an outer layer, including at its ends, does not allow such free expansion of the core and provides thereby dimensional stability of the current distribution bar. This in turn, allows the remounting of the current distribution bar together with the thereon attached electrode substrate in the recessed hole of the current supply element after having subjected the electrode to a restoration treatment. There is thus provided an electrode assembly which can be efficiently restored when needed, which does not require separation of the electrode substrate from the current distribution bar therefor.

Further, in known solutions in the prior art, the first end portion of the current distribution bar which is arranged in contact with the current supply element, is stripped of the cladding in order to provide a good conductive contact surface for contact there between, such to keep the electrical energy losses at a minimum. With the disclosed inventive electrode assembly, however, it was surprisingly found that electrical energy losses caused by the outer layer of the current distribution bar were insignificant for the process. This is ascribed the relatively thin thickness of the outer layer, generally comprised within the range of 0.1 to 5 mm. In a preferred embodiment, the thickness of the outer layer is comprised within the range of 0.5 to 3 mm. Providing an outer layer of the releasably arranged current distribution bar covering the complete core, including end surfaces thereof, thus allows removing the current distribution bar together with the electrode substrate from the current supply element and subjecting the resulting unit to restoration treatment, without compromising the energy consumption of the process in which the electrode assembly is operated.

According to an embodiment, the electrode comprises a plurality of current distribution bars, and the current supply element comprises a corresponding number of recessed holes, such that first end portions of each of the current distribution bars are arranged in a recessed hole of the current supply element.

In accordance with an embodiment of the electrode assembly, the first end portion of the at least one current distribution bar is arranged in the at least one recessed hole in a press fit engagement. A press fitting tool can be used for mounting and demounting the current distribution bar, or current distribution bars, at and from the current supply element. Press fitting can be carried out at a raised temperature in order to assure a good engagement of the current distribution bar with the current supply element. However, in accordance with an embodiment of the electrode assembly, the first end portion of the at least one current distribution bar is tapered, and the at least one recessed hole is of a corresponding tapered shape. Providing a tapered first end portion of the current distribution bar, and a corresponding tapered shape of the recessed hole, facilitates press fitting of the first end portion in the recessed hole, and allows mounting the current distribution bar at the current supply element at room temperature. Consequently, time and energy is saved in the mounting process of the electrode assembly.

In accordance with an embodiment of the electrode assembly, the tapered first end portion of the current distribution bar is obtained by said outer layer comprising a gradual reduction in thickness thereat. The gradual reduction of thickness of the outer layer of the first end portion of the current distribution bar can for example be obtained by machining the outer layer of the first end portion, for example by turning, to remove portions of the outer layer to a gradually increasing extent towards the end of the first end portion. Other alternatives for obtaining a tapered first end portion of the current distribution bar are also possible within the inventive concept, such as by means of isostatic or mechanical pressing.

In accordance with an embodiment of the electrode assembly, the recessed hole of the current supply element is a through hole. This facilitates the removal of the current distribution bar or bars from the current supply element.

In accordance with an embodiment of the electrode assembly, the outer layer comprises a cladding of a longitudinally extending surface of the core of the current distribution bar, and first and second outer end layers which cover transversal end surfaces of the core, wherein the outer end layers are arranged at the respective ends of the core by welding. The current distribution bar can thus be obtained by cutting a long bar comprising a cladding to a desired length, and subsequently welding outer end layers, e.g. caps, onto the exposed transversal end surfaces of the core, such to completely cover the same. Alternative ways of covering the transversal end surfaces with the outer end layers, such as by means of a fastening element or a coating method, are also possible within the inventive concept.

In accordance with an embodiment of the electrode assembly, the outer end layers are of the same material as the cladding. The outer layer is composed of a material which is inert in the process environment. In an embodiment of the electrode assembly for use in a relatively acid to lightly basic environment, i.e. oxidizing environment, the outer layer typically comprises a valve metal, such as titanium or tantalum. In an embodiment of the electrode assembly for use in an alkaline, or reducing, environment, the outer layer comprises nickel or stainless steel.

In accordance with an embodiment of the electrode assembly, the core comprises a good electrical conductor. Generally, the core material is selected among copper, aluminium, silver, and zinc.

According to a second aspect of the invention, there is provided an electrolytic cell comprising one or more electrode assemblies as disclosed herein. In accordance with an embodiment, the electrode assembly is adapted for use as an anode. In accordance with another embodiment, the electrode assembly is adapted for use as a cathode.

According to a third aspect of the invention, there is provided a method of mounting an electrode assembly comprising a current supply element comprising at least one recessed hole, at least one current distribution bar comprising first and second end portions, which first end portion is arranged at the recessed hole, and an electrode substrate arranged at the at least one current distribution bar. The first end portion is tapered and the at least one recessed hole is of a corresponding tapered shape. The method comprises the steps of attaching the electrode substrate to the at least one current distribution bar, and arranging the first end portion of the current distribution bar at the at least one recessed hole of the current supply element by means of press fitting, wherein the step of arranging the current distribution bar at the current supply element is carried out at room temperature. The tapered first end portion of the current distribution bar and the correspondingly tapered recessed hole facilitates press fit engagement of the current distribution bar and the current supply element, and allows press fitting to be carried out at room temperature. This provides an efficient installation of the electrode assembly.

In accordance with an embodiment of the method of mounting the electrode assembly, the step of arranging the at least one current distribution bar at the current supply element is carried out before attaching the electrode substrate to the current distribution bar.

According to a fourth aspect of the invention, there is provided a method of restoring an electrode assembly as disclosed herein. The method comprises the steps of removing the at least one current distribution bar from the current supply element, subjecting the electrode substrate to a cleaning process, recoating the electrode substrate with an electrochemically active coating, and arranging the first end portion of the at least one current distribution bar at the current supply element. Due to the entire outer surface of the current distribution bar being inert in the processing environment of the electrode assembly, there is no need to remove the electrode substrate from the current distribution bar for cleaning and recoating the same. Instead, the releasably arranged current distribution bar can conveniently be removed from the current supply element and be subjected to the restoration process without suffering surface damages or dimensional distortion. This allows saving time and energy. With respect to solutions involving replacement of the electrode substrate for a new electrode substrate, the method of restoring the electrode assembly as herein disclosed further provides significant economical advantages.

In accordance with an embodiment of the method of restoring the electrode assembly, the step of arranging the first end portion of the at least one current distribution bar at the current supply element is performed by press fitting. A press fitting tool may be used in order to achieve the press fit engagement between the current distribution bar and the current supply element, providing an easy and rapid mounting thereof.

In accordance with an embodiment of the method of restoring an electrode assembly in which the first end portion of the at least one current distribution bar and the at least one recessed hole of the current supply element are tapered, the step of arranging the first end portion of the at least one current distribution bar at the current supply element is carried out at room temperature. This allows saving time and energy in the mounting process of the electrode assembly.

In accordance with an embodiment of the method of restoring the electrode assembly, the cleaning process comprises removing any residues of electrochemically active coating from the electrode substrate by means of at least one of a salt bath treatment and blasting. Removing possible residues of coating by means of a salt bath treatment allows for a later recovery of the metals contained in such residues, which are generally materials of high value. When blasting is used for removing residual coating from the electrode substrate, the metals may also be recovered in a subsequent step of mineral refining. This adds value to the restoration process, and allows for both economical and environmental benefits.

BRIEF DESCRIPTION OF THE DRAWINGS

The invention will now be described in more detail and with reference to the appended drawings in which.

DESCRIPTION OF EMBODIMENTS

Figure 1:
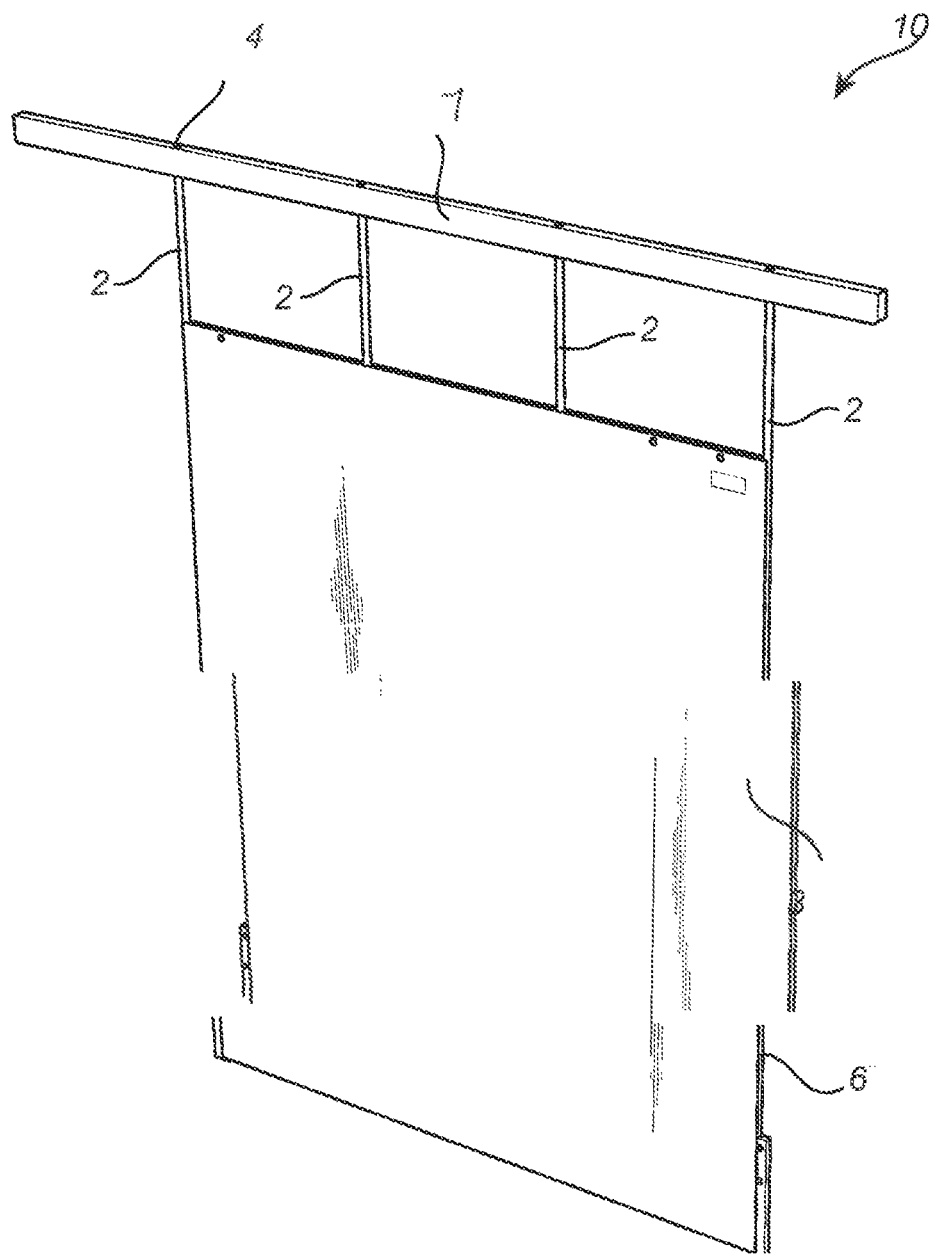
FIG. 1 is a perspective view of an electrode assembly according to an embodiment of the present invention.

With reference to FIG. 1, there is presented an electrode assembly 10 for an electrochemical process, for use in an electrolytic cell. The electrode assembly 10 comprises a current supply element 1, current distribution bars 2, and an electrode substrate 3 arranged at the current distribution bars 2. The current supply element 1 is here an elongated bar, generally arrangeable to extend horizontally across an electrolytic cell. The current supply bar 1 is not necessarily straight, however, but may for example be curved, or bent at one or more portions thereof. In the shown embodiment, the current supply element 1 has a rectangular cross-section. The cross-section of the current supply element 1 may, however, be of any other suitable shape, such as for example square, circular, or elliptical. The current supply element 1 is preferably made of a conducting material, such as but not limited to copper, aluminium, silver and zinc. In a preferred embodiment, the current supply element 1 is made of copper. The current supply element 1 is further provided with at least one recessed hole 4 for engagement with a current distribution bar 2. The current distribution bars 2 are arranged to extend perpendicularly to the longitudinal extension of the current supply element 1. Each current distribution bar 2 comprises a first end portion 5 (see FIG. 2) and a second end portion 6. The first end portion 5 of the current distribution bar 2 is arranged in a respective recessed hole 4 of the current supply element 1. Generally, and according to the shown embodiment of FIG. 1, the current distribution bar 2 extends vertically downwards from the horizontally arranged current supply element 1. In the exemplifying embodiment of FIG. 1, the electrode assembly 10 comprises four recessed holes 4 at the current supply element 1 and four current distribution bars 2. The number of recessed holes 4 is not limited to four, however, and can vary from one and onwards, depending on the dimension of the electrode assembly 1. Accordingly, the number of current distribution bars 2 can vary such to correspond to the number of recessed holes 4 of the current supply element 1. The current distribution bars 2 are here of a cylindrical shape. Any other suitable shape is, however, also possible for the current distribution bars 2, such as for example rectangular.

The electrode substrate 3 is arranged at the current distribution bars 2, extending from a portion of the current distribution bars 2 which is near the respective first end portions 5, towards the respective second end portions 6 thereof. In the shown embodiment, the electrode substrate 3 is a rectangular sheet. The electrode substrate 3 may, however, also be a mesh, or be of any other for the purpose suitable shape and structure. The electrode substrate 3 generally comprises a base structure of a material that is inert to the processing environment, and an electrochemically active coating arranged thereat. Examples of such electrochemically active coating and base structure are known in the art, and is e.g. disclosed in EP1670973. In a preferred embodiment, the base structure of the electrode substrate comprises titanium, and the coating comprises ruthenium and iridium. Other materials of the base structure and the coating are, however, also possible, such as those disclosed in aforementioned EP1670973.

Figure 2:
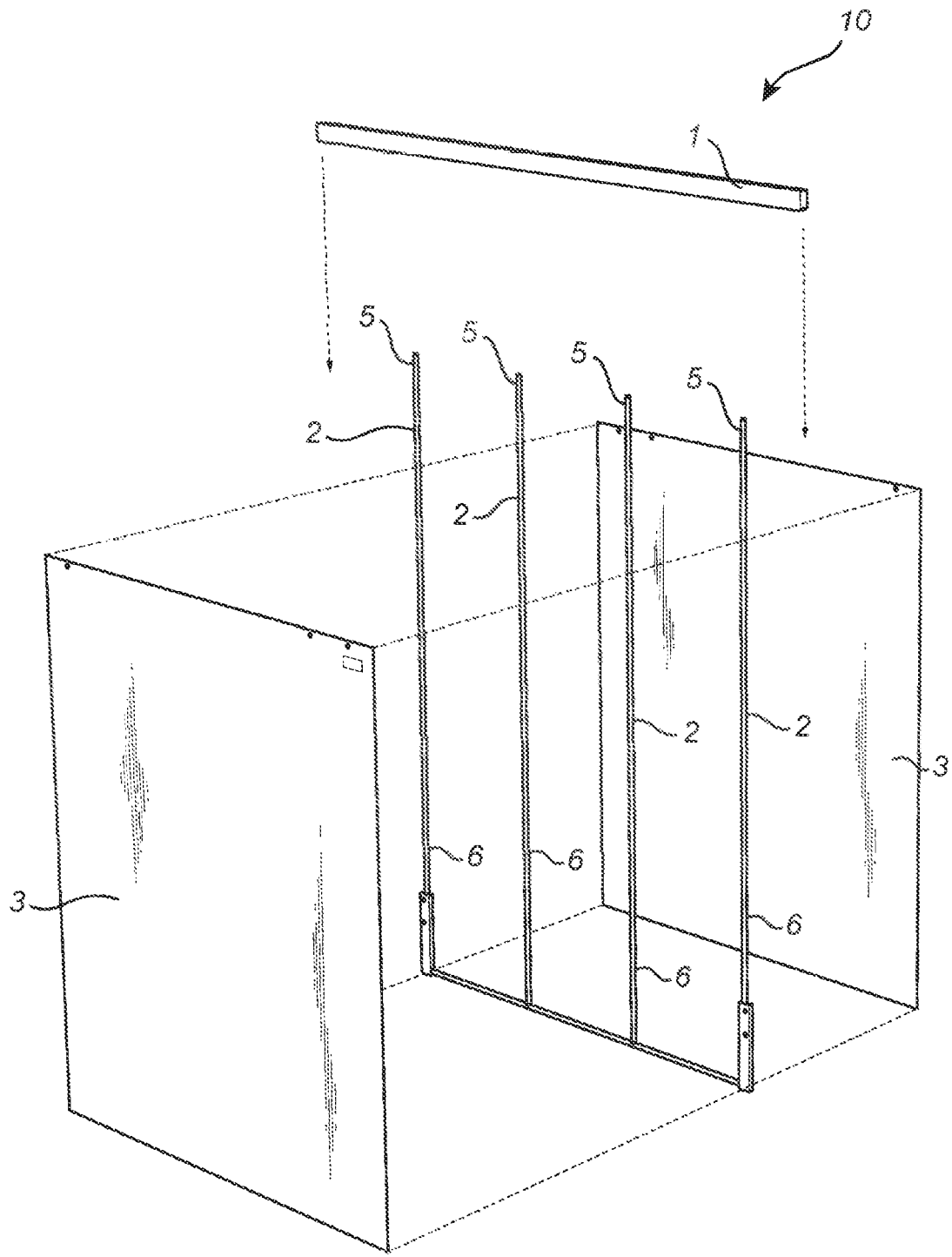
FIG. 2 is an exploded view of the electrode assembly shown in FIG. 1.

Continuing with reference to FIGS. 1 and 2, the first end portion 5 of each current distribution bar 2 is releasably arranged in a corresponding recessed hole 4 of the current supply element 1. The dimension of the recessed hole 4 is, thus, such that a current distribution bar 2 can be inserted therein. Preferably, the first end portion 5 of each current distribution bar 2 is arranged in the corresponding recessed hole 4 by means of press fitting. Therefore, the recessed hole 4 has a diameter which is slightly smaller than that of the first end portion 5 of the current distribution bar 2. Although the current distribution bars 2 and the recessed holes 4 here are shown as circular in cross-section, providing current distribution bars 2 and recessed holes 4 of another shape, such as for example rectangular, is also possible within the concept of the disclosed electrode assembly 10.

Figure 3:
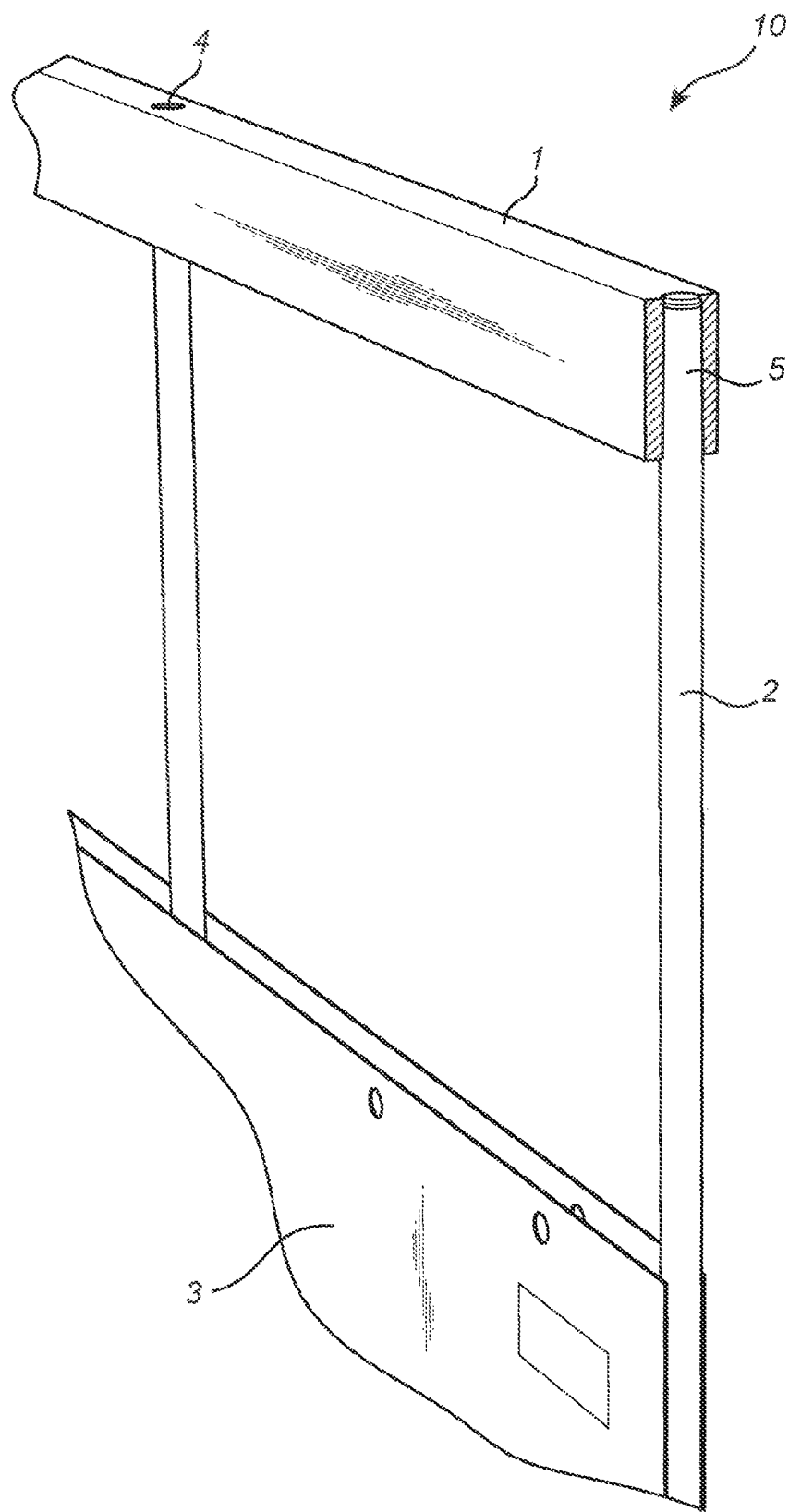
FIG. 3 is a partly cut-away view of a portion the electrode assembly shown in FIG. 1.

For press fitting of a current distribution bar 2 in a recessed hole 4, both of constant diameters, heating of the first end portion 5 of the current distribution bar 2 and/or the recessed hole 4 of the current supply element 1 is generally needed. However, it has been found that providing a slightly tapered first end portion 5 of the current distribution bar 2 and a correspondingly tapered recessed hole 4, according to this embodiment of the electrode assembly, as shown in FIG. 3, enables arranging the first end portion 5 in said recessed hole 4 by means of press fitting at room temperature, i.e. without modifying the temperature of the current supply element 1 or the current distribution bar 2 so that the temperature of the current supply element 1 is higher than the temperature of the current distribution bar 2. This allows for a fast and less energy consuming mounting of the current distribution bar 2 at the current supply element 1 and, thus, a more efficient mounting of the electrode assembly 10. In an alternative embodiment, the first end portion 5 of the current distribution bar 2 and the recessed hole 4 are of a constant dimension and, thus, not of a tapered shape.

Continuing with reference to FIG. 3, the recessed holes 4 are through holes. Providing through holes 4 at the current supply element 1 for the current distribution bars 2 to engage facilitates demounting of the current distribution bars 2 from the current supply element 1. Demounting is particularly facilitated when a through hole 4 is of a slight cone shape, in accordance with the embodiment shown in FIG. 3, provided that the first end portion 5 of the current distribution bar 2 is of a complementing cone shape. Providing a recessed hole 4 which is not a through hole, according to an alternative embodiment, is, however, also possible. Such a non-through hole may further be slightly tapered, such to engage with a correspondingly tapered first end portion 5 of the current distribution bar 2. A non-through hole may also, according to another embodiment, be of a constant cross-section such to engage with a first end portion 5 of the current distribution bar 2 having a correspondingly constant dimension.

To mount the electrode assembly 10 shown in part in FIG. 3, the electrode substrate 3 is attached to the current distribution bar 2. The attachment of the electrode substrate 3 to the current distribution bar 2 is in an embodiment achieved by welding. Other alternatives include using fastening elements, soldering or conductive adhesives. The current distribution bar 2 is subsequently arranged at the recessed hole 4 of the current supply element 1, here a through hole, by means of press fitting. More particularly, the first end portion 5 of the current distribution bar 2 is inserted into the recessed hole 4. Due to the tapered first end portion 5 and through hole 4, arranging the current distribution bar 2 at the current supply element 1 can be carried out at room temperature. In another embodiment, in which the first end portion 5 and the through hole 4 is of constant dimensions, press fitting of the current distribution bar 2 into the current supply element 1 is carried out at a raised temperature.

According to an alternative method of mounting the electrode assembly 10, the step of arranging the current distribution bar 2 or bars at the current supply element 1 is carried out before arranging the electrode substrate 3 at the current distribution bar 2 or bars.

Figure 4:
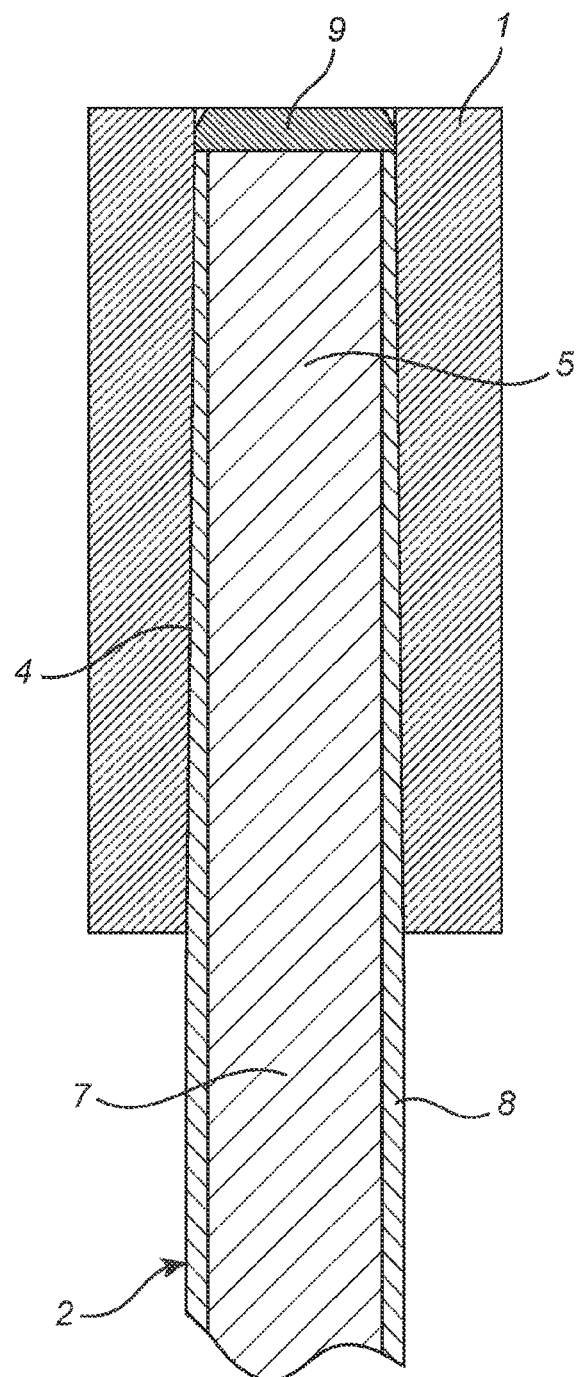
FIG. 4 is a cross-sectional view of a portion of a current supply element and a current distribution bar of the electrode assembly shown in FIG. 1.

With reference now to FIG. 4, in accordance with an embodiment of the electrode assembly 10, the current distribution bar 2 is composed of a core 7 and an outer layer 8. The core 7 is made of an electrically conducting material, such as for example copper, aluminium and silver. Such materials are often reactive to the processing environment in which the electrode assembly 10 is used, i.e. to the electrolyte solution of the electrolytic cell. The current distribution bar 2 therefore further comprises an outer layer 8 arranged to prevent the core 7 from chemically reacting with the processing environment, e.g. the electrolyte, which for example could cause severe corrosion of the core 7, and thus, lead to a short durability of the electrode assembly 10. The core 7 is here clad in the outer layer 8, which is chosen from materials which are inert in the processing environment. In an embodiment of an electrode assembly 10 used as an anode, for example, the outer layer 8 is preferably selected from the group of valve metals, such as but not limited to titanium and tantalum. In a preferred embodiment, the outer layer 8 is made of titanium and the core 7 is made of copper.

The outer layer 8 completely covers the core 7 of the current distribution bar 2, including at end surfaces thereof. The end surfaces of the core 7 are, in the shown embodiment, covered by respective outer end layers 9 consisting of a cap which is welded onto the corresponding end surface of the core 7. Such a cap is here of the same material as the cladding of the core of the current distribution bar 2. In another embodiment, the caps are of a material different from the cladding. In any case, the material of the outer end layers 9 is chosen from materials which are inert in the processing environment in which the electrode assembly 10 is used, i.e. which do not react chemically therewith. The skilled person understands that an outer end layer 9 may be provided in ways different from a cap welded to the end surfaces of the core 7. For example, outer end layers 9 may be fastened by fastening elements, by soldering, or by means of a conductive adhesive. In another embodiment, the outer end layers 9 are deposited at the corresponding end surface of the core 7 as a coating. The thickness and engagement of the outer end layers 9 are such that they withstand the forces exerted thereon, particularly of the outer end layer 9 of the first end portion 5, when the current distribution bar 2 is removed from the current supply element 1.

Further, in the exemplifying embodiment of FIG. 4, the first end portion of the current distribution bar 2 is tapered. The tapered shape is here provided by the outer layer 8 of the first end portion 5 having a gradual thickness reduction towards the end of the first end portion 5. The gradual thickness reduction of the outer layer 8 is generally obtained by machining the first end portion 5 such that the outer layer 8 is gradually worn down towards the end of the first end portion 5. The total reduction in thickness of the outer layer 8 is smaller than the thickness of the outer layer at a portion of the current distribution bar 2 not having been subjected to thickness reduction. Thus, the outer layer 8 is at no point of the current distribution bar 2 completely eliminated. That is, the outer layer 8 encompasses the core 7 completely. This is highly advantageous as the generally reactive core material remains entirely encapsulated by the outer layer 8 even after removal of the current distribution bar 2 from the current supply element 1. This, in turn, allows subjecting a substrate 3 attached to the current distribution bars 2 to restoring treatments, including e.g. removal of residual coating from the substrate 3 and coating it anew, after the removal of the current distribution bars 2 from the current supply element 1 but without having to detach the electrode substrate 3 from the current distribution bars 2.

Figure 5:
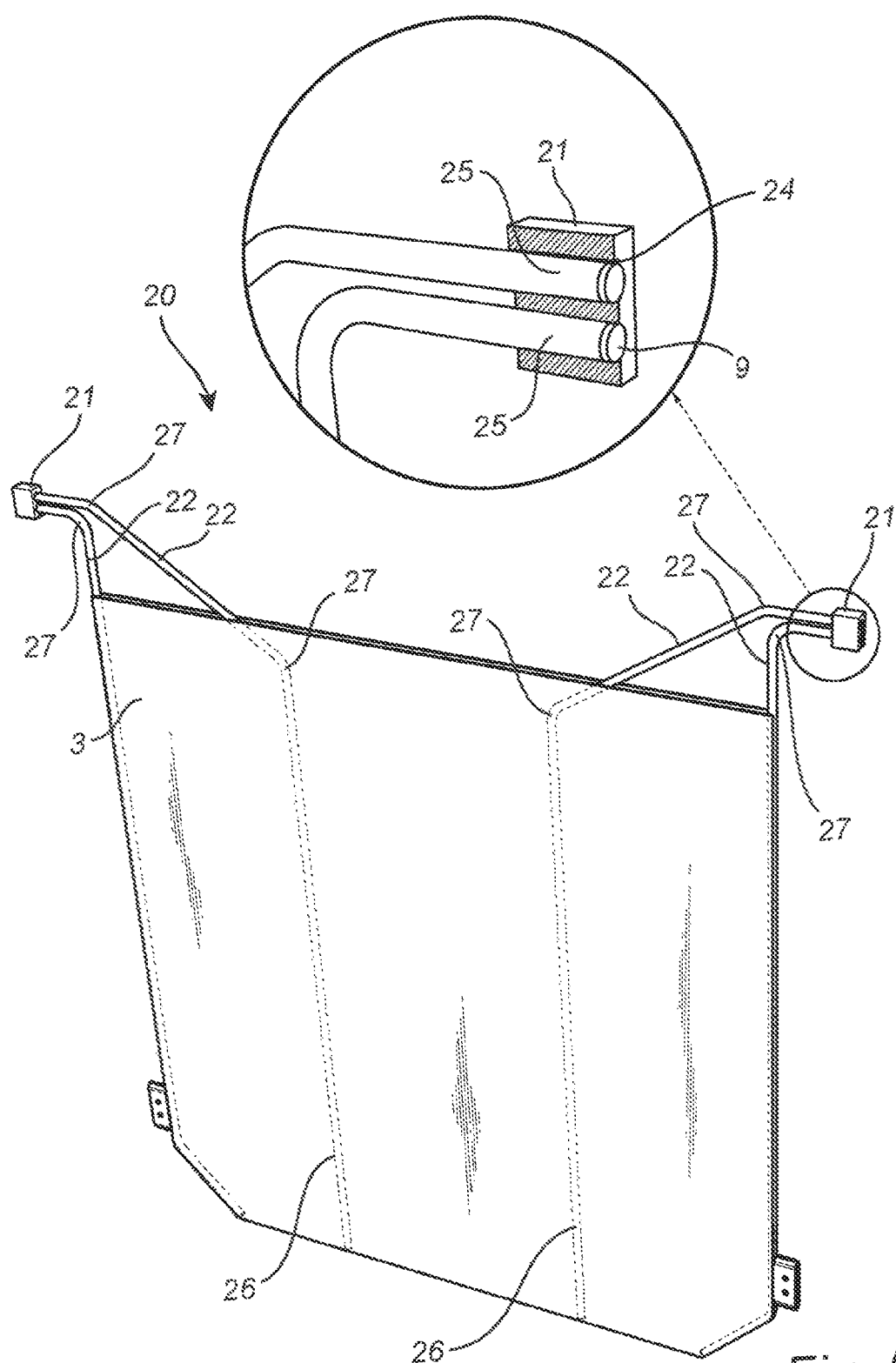
FIG. 5 is a perspective view of an electrode assembly according to another embodiment of the present invention.

With reference to FIG. 5, there is presented an alternative embodiment of an electrode assembly 20 for an electrochemical process. According to this embodiment, the electrode assembly 20 comprises two current supply elements 21 in the form of blocks. The current supply elements 21 of this embodiment are arrangeable at opposing sides of an electrolytic cell. The current supply elements 21 each comprise two recessed holes 24 extending from a side of the block-shaped current supply elements 21 to an opposing side thereof. The recessed holes 24 are here through holes, as shown in the partly cut-away detail view in FIG. 5. In an alternative embodiment, the recessed holes 24 are not through holes, i.e. do not extend completely through the current supply element 21. As described for the previous embodiment with reference to FIGS. 1-4, the recessed holes 24 may be tapered. Providing recessed holes 24 which have a constant diameter is, however, also possible within the concept of the present invention.

The electrode assembly 20 further comprises four current distribution bars 22 comprising respective first and second end portions 25, 26. The first end portion 25 and each current distribution bar 22 is arranged in a recessed hole 24 of one of the current supply elements 21. The first end portion 25 of this exemplifying embodiment is slightly tapered, facilitating press fitting of the current distribution bar 22 into the recessed hole 24. In another embodiment, the first end portion 25 is of a constant dimension. The number of recessed holes 24 and current distribution bars 22 is not limited to four, and can be adapted to the requirements of the process in which the electrode assembly is to be used.

A portion of the current distribution bar 22 adjacent to the first end portion 25 thereof extends horizontally from the recessed hole 24 of the current supply element 21. The current distribution bar 22 further comprises one or two bent portions 27, by which the current distribution bar 22 is bent such that the second end portion 26 thereof extends substantially perpendicularly to the extension of the first end portion 25, i.e. vertically. The angle of the bent portion 27 of the current distribution bars 22 can differ from one current distribution bar 22 to another, such that the vertically extending portions of the current distribution bars 22 are arranged in parallel with a distance there between. The electrode substrate 3 of the electrode assembly 20 can thereby be fastened to the current distribution bars 22 in the same manner as described for the previous embodiment. In the shown embodiment, the angle of the bent portion 27 of the two outermost current distribution bars 22 of the electrode assembly 20 is approximately 90°. The two centrally arranged current distribution bars 22 of the electrode assembly 20 each comprises two bent portions 27 having an angle of more than 90°, more particularly approximately 135°. As can be understood by the skilled person, providing bent portions 27 of different angles is, however, also possible within the concept of the electrode assembly 20.

As in the previously described embodiment, the current distribution bars 22 comprises a core 7 and an outer layer 8. The outer layer further comprises outer end layers 9, such that the entire core 7 is encompassed by the outer layer 8. The current supply elements 21 are made of an electrically conducting material for conducting current to the current distribution bars 22. The current distribution bars are, likewise, made of electrically conducting material for conducting current to the electrode substrate 3. Possible materials for the components of the electrode assembly 20 are the same as previously described herein.

When the efficiency of the electrode substrate 3 of the disclosed electrode assembly 10, 20 is reduced and needs to be restored, the electrode assembly 10, 20 can be dismounted and the electrode substrate 3 restored according to a method comprising a first step of removing the current distribution bar or bars 2, 22 from the current supply element 1, 21; a second step of subjecting the electrode substrate 3 to a cleaning process, a third step of recoating the electrode substrate 3 with an electrochemically active coating, and a fourth step of arranging the current distribution bar 2, 22 at the current supply element 1, 21. The first step of removing the current distribution bar or bars 2, 22 from the current supply element 1, 21 is facilitated by providing a tapered first end portion of the current distribution bar 2, 22 and the recessed hole 4, 24, as previously described. It is further facilitated by providing a recessed hole 4, 24 at the current supply element 1, 21 which is a through hole. Carrying out the step of removal at a raised temperature allows, however, the removal of a current distribution bar 2, 22 comprising a first end portion 5, 25 which is of a constant cross-section also.

Subsequent to the removal of the current distribution bar 2, 22, and the thereto attached electrode substrate 3, the step of subjecting the electrode substrate 3 to a cleaning process is carried out. The cleaning process generally comprises eliminating residues of the worn electrochemically active coating from the electrode substrate 3, such that it is clean before applying a new coating thereto. The cleaning process is preferably carried out by means of a treatment as disclosed in U.S. Pat. No. 5,141,563, involving salt baths heated to temperatures up to 450° C. Such a treatment allows recovering valuable elements of the residual coating, for reuse thereof. Another cleaning process which is possible is blasting. Other alternative methods for cleaning the electrode substrate such that any residual coating is removed therefrom may also be used.

The recoating of the third step is generally carried out stepwise at different temperatures between 300 and 600° C. Due to the outer surface of the current distribution bar 2, 22, such as the outer layer 8, being of a material which is inert in the processing environment of the electrode assembly 10, 20, removal of the current distribution bar 2, 22 from the electrode substrate 3 for cleaning and recoating is not necessary. Instead, the structure comprising the current distribution bars 2, 22 and the electrode substrate 3 can be subjected to the cleaning and coating process jointly, without causing damages to the current distribution bars 2, 22.

The step of arranging the current distribution bar 2, 22 at the current supply element 1 is generally carried out by means of press fitting of the first end portion 5, 25 of the current distribution bar 2, 22 into the recessed hole 4, 24 of the current supply element 1, 21. In the embodiment of the electrode assembly wherein the first end portion 5, 25 of the current distribution bar 2, 22 and the recessed hole 4, 24 of the current supply element 1 are tapered, the step of arranging is preferably carried out at room temperature.

While the invention has been illustrated and described in detail in the drawings and foregoing description, such illustration and description are to be considered illustrative or exemplary and not restrictive. The invention is not limited to the disclosed embodiments. The invention is generally applicable to any process using an electrode assembly comprising a current distribution bar with a core and an outer layer. Examples of such processes are electrowinning, electrogalvanizing, electroliberation, the chloralkali diaframgma process and processes using monopolar chlorate anodes. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

What is claimed is:

1. An electrode assembly for an electrochemical process comprising:
   a current supply element comprising at least one recessed hole;
   at least one current distribution bar comprising a first end portion and a second end portion, said first end portion being releasably arranged at said at least one recessed hole; and
   an electrode substrate arranged at said at least one current distribution bar,
   wherein said current distribution bar comprises a core and an outer layer, said core being completely covered by said outer layer.

2. The electrode assembly according to claim 1, wherein said first end portion of said current distribution bar is arranged at said recessed hole of said current supply element in a press fit engagement.

3. The electrode assembly according to claim 1, wherein said recessed hole of said current supply element is a through hole.

4. The electrode assembly according to claim 1, wherein said outer layer comprises a cladding of a longitudinally extending surface of said core of said current distribution bar, and first and second outer end layers which cover transversal end surfaces of said core, said outer end layers being arranged thereat through a weld joint.

5. The electrode assembly according to claim 1, wherein said first end portion of said at least one current distribution bar is tapered, and said at least one recessed hole of said current supply element is of a correspondingly tapered shape.

6. The electrode assembly according to claim 5, wherein said tapered first end portion is obtained by said outer layer of said at least one current distribution bar comprising a gradual reduction in thickness thereat.

7. The electrode assembly according to claim 4, wherein said outer end layers are made of the same material as said cladding of said outer layer.

8. An electrolytic cell comprising the electrode assembly according to claim 1.

9. An electrolytic cell comprising the electrode assembly according to claim 2.

10. An electrolytic cell comprising the electrode assembly according to claim 3.

11. An electrolytic cell comprising the electrode assembly according to claim 4.

12. An electrolytic cell comprising the electrode assembly according to claim 5.

13. An electrolytic cell comprising the electrode assembly according to claim 6.

14. An electrolytic cell comprising the electrode assembly according to claim 7.

15. A method of mounting an electrode assembly comprising a current supply element comprising at least one recessed hole, at least one current distribution bar comprising first and second end portions, which first end portion is arranged at said recessed hole, and an electrode substrate arranged at said at least one current distribution bar, wherein said first end portion is tapered and said at least one recessed hole is of a correspondingly tapered shape, and wherein said current distribution bar comprises a core and an outer layer, said core being completely covered by said outer layer, the method comprising the steps of:
   attaching said electrode substrate to said at least one current distribution bar; and
   arranging said first end portion of said current distribution bar at said at least one recessed hole of said current supply element by means of press fitting, wherein said step of arranging said current distribution bar at said current supply element is carried out at room temperature.

16. The method according to claim 15, wherein said step of arranging said at least one current distribution bar at said current supply element is carried out before arranging said electrode substrate at said current distribution bar.

17. A method of restoring an electrode substrate of the electrode assembly according to claim 1, the method comprising the steps of:
   removing said at least one current distribution bar from said current supply element;
   subjecting said electrode substrate, arranged at the at least one current distribution bar, to a cleaning process;
   recoating said electrode substrate with an electrochemically active coating; and
   arranging said first end portion of said current distribution bar at said current supply element.

18. The method according to claim 17, wherein said cleaning process comprises removing any residues of the electrochemically active coating from said electrode substrate by means of at least one of a salt bath treatment and blasting.

19. The method according to claim 17, wherein said step of arranging said first end portion of said at least one current distribution bar at said current supply element is performed by press fitting.

20. The method according to claim 19, wherein said step of arranging said first end portion of said at least one current distribution bar at said current supply element is carried out at room temperature.

* * * * *